United States Patent [19]

Duryea, Jr.

[11] 4,023,426

[45] May 17, 1977

[54] BELT STABILIZING APPARATUS

[75] Inventor: George R. Duryea, Jr., Buffalo, N.Y.

[73] Assignee: Calspan Corporation, Buffalo, N.Y.

[22] Filed: June 23, 1975

[21] Appl. No.: 589,286

[52] U.S. Cl. .................................. 74/241; 198/837
[51] Int. Cl.² .................... F16H 7/18; B65G 15/62
[58] Field of Search ............. 74/241, 240; 198/202

[56] References Cited

UNITED STATES PATENTS

| | | | |
|---|---|---|---|
| 994,910 | 6/1911 | Duesterhoff | 74/241 |
| 2,709,588 | 5/1955 | Staege | 74/241 X |
| 3,043,153 | 7/1922 | Hindle et al. | 74/241 X |
| 3,518,739 | 7/1970 | Butler | 74/241 X |
| 3,702,131 | 11/1972 | Stokes et al. | 74/241 X |
| 3,715,027 | 2/1973 | Fujimoto et al. | 198/806 |
| 3,731,550 | 5/1973 | Malecki et al. | 74/241 X |
| 3,818,391 | 6/1974 | Jordan et al. | 198/806 X |

FOREIGN PATENTS OR APPLICATIONS 492,574  9/1938   United Kingdom ............... 198/202

Primary Examiner—Leonard H. Gerin
Attorney, Agent, or Firm—Allen J. Jaffe

[57] ABSTRACT

The present invention relates to a belt stabilizing apparatus for maintaining a belt stable about a pair of rotating drums in response to lateral forces applied thereto. One of the drums is mounted for pivotal movement about an axis perpendicular to the normal axis of rotation thereof and contained in a plane perpendicular to the planes containing the loaded and unloaded spans of the belt such that as the drum pivots in response to lateral forces the belt tends to move in a direction opposite thereto and resilient means is provided to limit the pivotal movement of the drum and prevent the belt from riding off the drums in such opposite direction.

20 Claims, 4 Drawing Figures

BELT STABILIZING APPARATUS

BACKGROUND OF THE INVENTION

The present invention relates to simulated roadway units of the type wherein an endless belt forming the simulated roadway surface is looped around a pair of rotary drums. More particularly, the present invention relates to the stabilization of the belt in response to forces acting laterally in the plane of the upper surface of the belt.

In simulated roadway units employed generally for tire testing the tire or tires are in rotary contact with the upper portion of the belt which may drive the tires or be driven by the tires. In other words, the belt may be passive or active. The combination of forces imparted to the belt produce an unusually large lateral force component which, if uncorrected, can cause the belt to drift off the drums. It is therefore essential than an efficient, simple and inexpensive stabilizing mechanism be provided to counterbalance and correct such lateral force components.

Generally, various apparatus have been suggested for stabilizing endless belts mounted on drums, these are typified by U.S. Pat. Nos. 3,635,475; 2,484,473; and 994,910 which, respectively, relate to a fluid servo control system; an electric motor servo control system; and a gear train control system. These systems are complex, costly and consist of a relatively large number of moving parts each of which are subject to defects or failure.

SUMMARY OF THE INVENTION

The foregoing disadvantages of the prior art are overcome according to the teachings of the present invention which provides a belt stabilizing mechanism which is simple, efficient, inexpensive and trouble-free in operation.

Essentially the present invention provides a pair of drums about which an endless belt is supported for rotary motion around the drums and linear motion therebetween, one of the drums is constrained for rotation about its central axis whereas the other drum, in addition to rotation about its central axis, is mounted for movement about a second axis perpendicular thereto and in a plane parallel to the planes of the portions of the belt which are located between the drums and there is further provided resilient means for providing a clockwise and counterclockwise torque to said one drum about said second axis in response, respectively, to counterclockwise or clockwise movement of said drum about said second axis.

According to one embodiment of the present invention the resilient means may comprise one or more coil springs located between said one drum and its foundation on opposite sides of said second axis whereas according to a second embodiment said resilient means may comprise a beam spring located between said one drum and its foundation and spaced from said second axis.

BRIEF DESCRIPTION OF THE DRAWINGS

For a fuller understanding of the present invention reference should now be had to the following detailed description thereof taken in conjunction with the accompanying drawings, wherein.

DESCRIPTION OF THE PREFERRED EMBODIMENTS

Figure 1:
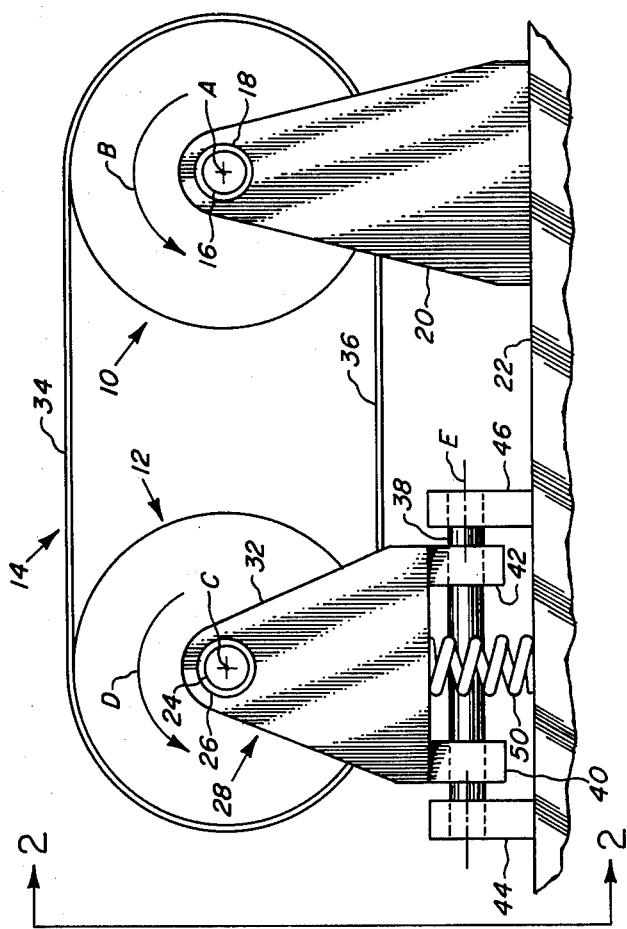
FIG. 1 is a schematic front elevation view of the apparatus according to the present invention.
Figure 2:
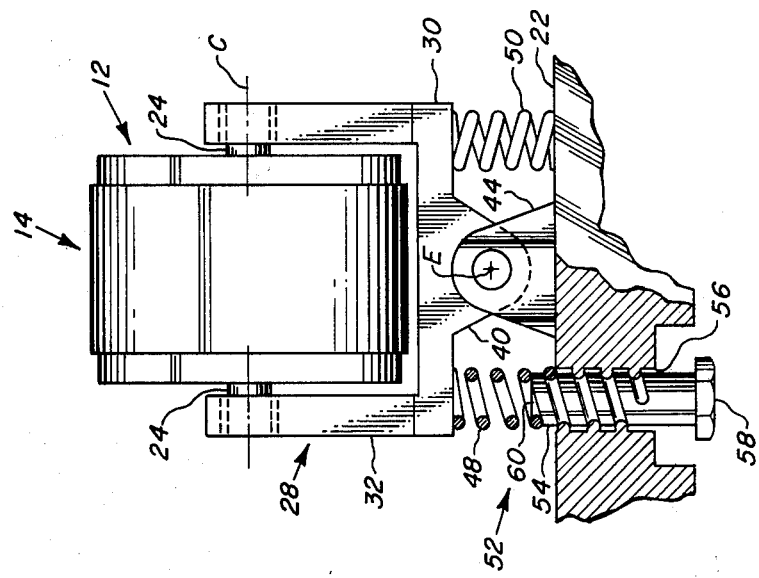
FIG. 2 is a side view taken along line 2—2 of FIG. 1.

Referring now to the drawings and, more particularly, to FIGS. 1 and 2, the simulated roadway unit is generally depicted as comprising a pair of drums 10 and 12 and an endless belt 14 looped therearound. Drum 10 is suitably mounted for rotation about an axis A in the direction of arrow B by means of a shaft 16 fixed to drum 10 and supported by a pair of bearings 18 which are fixedly secured to a pair of arms 20. Since each bearing 18 and arm 20 are similarly located on opposite sides of drum 10 only one of each has been illustrated. Arms 20 are rigidly secured to a foundation or ground 22 such that the only substantial movement permitted drum 10 is rotation about axis A.

Drum 12 is suitably mounted for rotation about axis C in the direction of arrow D by means of a shaft 24 fixed to drum 12 and supported by a pair of bearings 26 on opposite sides thereof. Bearings 26 are fixedly secured to a substantially U-shaped support member depicted generally at 28. Support member 28 comprises a base 30 from which extend a pair of support arms 32 on opposite sides of drum 12, each of which have openings for reception of the bearings 26 and drum shaft 24.

Base 30 of support member 28 is mounted for rotation about an axis E which is perpendicular to the normal rotational axis C of drum 12 and contained within a plane which is parallel to the planes containing the loaded and unloaded spans 34, 36, respectively, of belt 14. To permit such rotation about axis E, a shaft 38 passes through openings in a pair of hinges 40, 42 which are fixed to and depend from base 30 on each end thereof. A pair of similar hinges 44, 46 fixed to foundation 22 have openings therein for reception of shaft 38. As can be seen, the arrangement is such that drum 10 is permitted one degree of freedom (rotation about axis A) whereas drum 12 is permitted two degrees of freedom (rotation about axes C and E).

Resilient means in the form of compression coil springs 48 and 50 are mounted between base 30 and foundation 22. Each spring 48, 50 is mounted on opposite sides of axis E to provide, respectively, clockwise and counterclockwise torques to drum 12.

As is well known, suitable belt tensioning structure may be provided to adjust the tension of belt 14.

In the operation of the embodiment thus far described, one of drums 10, 12 may be driven by a suitable drive system, as is well known, imparting rotary motion to portions of belt 14 about the drums and linear motion to portions thereof between the drums. An automobile tire or the like (not illustrated) contacts the loaded span 34 of belt 14 and is driven thereby. Alternatively, the drums may be passive and may be driven by the supported load on span 34. Of the relative forces imparted to the supported span 34 of belt 14 a lateral force component may exist parallel to axes A and C, which if uncorrected, can force the belt off the drums. Assuming that such lateral force component causes drum 12 to pivot or cant counterclockwise about axis E, the belt 14 will tend to move off the drums in a direction opposite to that of the lateral force; however spring 48 provides a clockwise torque to drum 12 to limit the counterclockwise pivotal movement thereof about axis E which, in turn, stabilizes the belt. In other words, without the action of spring 48 drum 12 will pivot too far about axis E causing the belt 14 to ride off the drum in a direction opposite to that of the lateral force. The spring 48 functions to limit such pivotal movement to just that required to maintain the belt on the drum. Similarly, assuming a lateral force which causes drum 12 to pivot clockwise about axis E, spring 50 functions to limit such pivotal movement to just that required to maintain the belt in a stabilized position on the drum.

To properly perform their function the springs must have characteristics tailored to the geometrical arrangement of the drums and belt system. It has been found that the torsional effective spring constant, $K_T$, about axis E is ideally determined by the following relationship:

$$K_T = 12EIRD/l^3$$

where,

E is the elastic modulus of the belt material;
I is the moment of inertia of the belt in the plane of the lateral force;
R is the distance between the edge of the drum 12, which contacts the loaded belt span, and the axis E;
D is the diameter of the drum 12; and
l is the length of the belt between drum tangents.

The linear spring constant, $K_L$, of each coil spring as part of the spring system can be expressed as:

$$K_L = \frac{K_T}{2d^2}$$

where, d is the perpendicular distance between the longitudinal axis of the spring and the axis E.

It must be emphasized that the above relationships express the theoretical or ideal spring constants; in practice actual spring constants will vary slightly from ideal. Nevertheless, the ideal values represent limits to which the actual values must approach. Furthermore, in actual practice, it is preferred that the spring constants be adjustable to take into account variations from the ideal or theoretical system. To this end, as illustrated in FIG. 2, a suitable adjusting mechanism generally depicted at 52 may be applied to each coil spring 48 and 50 only 48 of which is illustrated in section. Since the spring constant is, among other things, a function of the number of coils, adjusting mechanism 52 functions to vary the effective number of operative coils.

As illustrated, adjusting mechanism 52 comprises a threaded bolt 54 cooperating with an internally threaded opening 56 through foundation 22. The end of bolt 54 remote from spring 48 has a hex head 58 or the like for ease in importing rotary motion thereto, whereas opposite end 60 fits between the coil of spring 48. The pitch of the belt threads and the opening threads 56 correspond to the pitch of the spring coils such that as bolt 54 is rotated it is screwed into or out of the spring coils to thereby decrease or increase the effective number of operative coils thereof which, in turn, varies the spring constant. A similar adjusting mechanism is provided for spring 50.

Although the above described embodiment incorporates resilient means in the form of a pair of coil springs to limit the pivotal movement about axis E in response to lateral forces on the belt, other forms of limiting means are contemplated. For example, a beam spring arrangement may be employed as is disclosed in the embodiment of FIGS. 3 and 4 wherein like numerals refer to similar parts of the FIGS. 1 and 2 embodiment except for the application of primes to such numerals.

Figure 4:
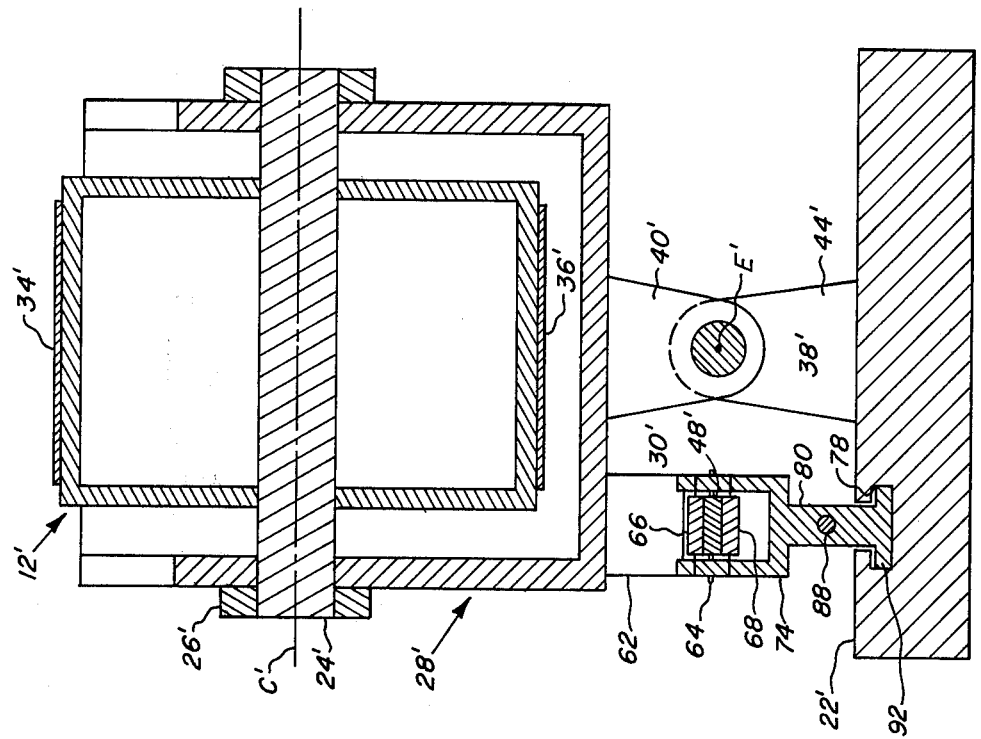
FIG. 4 is a view along line 4—4 of FIG. 3.
Figure 3:
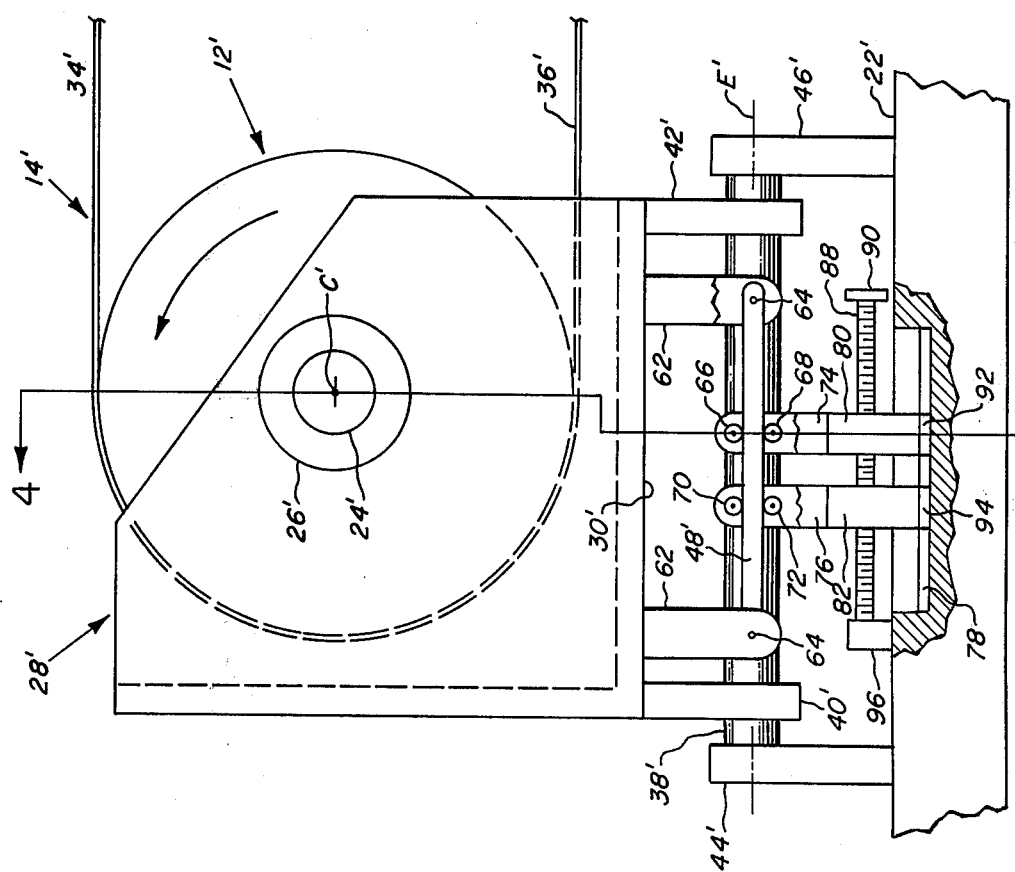
FIG. 3 is a fragmentary front elevation view of a second embodiment.

Referring now to FIGS. 3 and 4, the drum 12' is supported for rotation about axis C' by means of a shaft 24' fixed thereto passing through bearings 26' on opposite sides of the drum and fixed to a drum support member, generally depicted at 28'. Support member 28' is mounted for pivotal motion about axis E' by means of a pair of hinges 40', 42' depending therefrom on opposite ends of support base 30', a shaft 38' passing through openings in the hinges and a pair of similar hinges 44', 46' fixed to foundation 22' and to shaft 38'.

A substantially rectangular beam spring 48' fabricated of any suitable resilient material, such as steel, is fixedly secured to base 30' by means of a pair of depending arms 62 each having one end fixed to base 30' and the other end pinned at 64 to beam spring 48'. The arrangement is such that spring 48' is spaced from pivot axis E' and is located in a plane substantially parallel to the planes containing belt spans 34' and 36'. Spring 48' is supported by foundation 22' by means of two pairs of rollers 66, 68 and 70, 72, pinned, respectively, for rotation to yokes 74 and 76 which are slidingly received in a longitudinal slot 78 in foundation 22'. Yokes 74 have posts 80, 82 depending therefrom having aligned threaded openings 84, 86 through which is received a threaded adjusting bolt 88 adapted to be rotated by a handwheel 90 or the like. Openings 84, 86 are oppositely threaded (one is right-hand; the other left-hand) such that rotation of bolt 88 causes opposite, but equal, movement of posts 80, 82 and their associated structure. Posts 80, 82 terminate in bases 92, 94 perpendicular thereto and slidingly received in longitudinal slot 78 in foundation 22'. Bolt 88 is suitably supported by a bearing or the like 96 on an end thereof remote from the handwheel 90.

The operation of the FIGS. 3 and 4 embodiment is similar to that previously described except that beam spring 48' functions as a bidirectional spring replacing the coils springs of the FIGS. 1 and 2 embodiment. Thus, lateral forces causing pivotal movement of drum 12' about axis E' are limited by the resistance of beam spring 48' to thereby prevent belt 14' from riding off the drums in a direction opposite to that of the lateral forces. As in the previously described embodiment the spring constant of beam spring 48' must be tailored to just that required to limit the clockwise or counterclockwise motion of drum 12' about axis E'. Ideally the spring constant required is given by the following relationship:

$$K = \frac{12EI}{x^2(3l - 4x)}$$

where,

K is the beam spring constant
EI is the flexure modulus of rigidity of the beam spring material
x is the distance between each pair of rollers and the supported ends of the spring nearest thereto, and
l is the length of the spring between supports points 64.

The spring constant can be varied by changing X under actual operating conditions. This distance X is changed by rotation of adjusting bolt 88 causing rollers 66, 68 and 70, 72 to move closer together or further apart.

Although preferred embodiments of the present invention have been described, changes will obviously occur to those skilled in the art; it is therefore intended that the scope of the present invention is to be limited only by the scope of the appended claims.

I claim:

1. Belt stabilizing apparatus, comprising;
   a. a first drum mounted for rotation about a first axis,
   b. a second drum mounted for rotation about an axis parallel to said first axis,
   c. an endless belt mounted about said drums providing a pair of a parallel spans between said drums,
   d. means for permitting pivotal movement of said second drum, in response to lateral forces applied to said belt, about a second axis which is substantially perpendicular to said first axis and contained in a plane substantially parallel to the planes containing said spans, and
   e. resilient means for limiting pivotal movement of said second drum about said second axis in response to lateral forces applied to said endless belt to prevent said belt from riding off said drums in a direction opposite to that of said lateral forces.

2. The apparatus of claim 1, wherein;
   f. said resilient means is spaced from said second axis.

3. The apparatus of claim 1, wherein there is further provided;
   f. means for adjusting the constant of said resilient means.

4. The apparatus according to claim 1, wherein there is further provided;
   f. a stationary foundation supporting said second drum about said first and second axes, and
   g. said resilient means is located between said second drum and said foundation.

5. The apparatus according to claim 4, wherein;
   h. said resilient means comprises a beam spring spaced from said second axis.

6. The apparatus according to claim 5, wherein their is further provided;
   i. means for adjusting the spring constant of said beam spring.

7. The apparatus of claim 6 wherein;
   j. said means for adjusting the spring constant of said beam spring comprises rollers in contact with said beam spring and means for varying the spacing between said rollers.

8. The apparatus according to claim 5, wherein;
   i. said beam spring is substantially rectangular in section having longitudinal ends fixed to said foundation and there is further provided:
   j. rollers supported for rotary motion by said foundation and located between said ends and in rotary contact with said beam spring.

9. The apparatus according to claim 8, further comprising;
   k. means to adjust the position of said rollers along the longitudinal extent of said beam spring to thereby vary the effective spring constant thereof.

10. The apparatus according to claim 4, wherein;
    h. said resilient means comprises a coil spring spaced from said second axis.

11. The apparatus according to claim 10, wherein there is further provided
    i. means for adjusting the spring constant of said coil spring.

12. The apparatus according to claim 11, wherein;
    j. said last mentioned means comprises threaded bolt located in a threaded opening in said foundation and adapted to be screwed into and out of the coils of said coil spring to thereby decrease or increase the operative number of coils thereof.

13. The apparatus according to claim 10, wherein;
    i. said resilient means further comprises an additional coil spring spaced from said second axis on a side thereof opposite to that of said first mentioned coil spring.

14. The apparatus according to claim 13, wherein there is further provided;
    j. means for adjusting the spring constant of said additional coil spring.

15. The apparatus according to claim 13, wherein said adjusting means for said additional coil spring comprises;
    k. a threaded bolt located in a threaded opening in said foundation and adapted to be screwed into and out of the coils of said additional coil spring to thereby decrease or increase the operative number of coils thereof.

16. The apparatus according to claim 1, wherein;
    f. said resilient means comprises a pair of coil springs spaced on opposite sides of said second axis.

17. The apparatus according to claim 16, wherein there is further provided;
    g. a stationary foundation supporting said second drum about said first and second axes, and
    h. said coil springs are located between said second drum and said foundation.

18. The apparatus according to claim 1, wherein;
    f. said resilient means comprises a pair of coil springs located on opposit sides of said second axis.

19. The apparatus according to claim 1, wherein;
    g. said resilient means comprises a beam spring.

20. The apparatus according to claim 19 further comprising;
    h. means for adjusting the spring constant of said beam spring.

* * * * *